United States Patent
Golden et al.

[15] 3,657,945
[45] Apr. 25, 1972

[54] REFLECTOR BICYCLE PEDAL

[72] Inventors: Gerald Golden, Highland Park; Charles V. Wrobel, Lake Forest, both of Ill.

[73] Assignee: Excel Incorporated, Franklin Park, Ill.

[22] Filed: Nov. 14, 1969

[21] Appl. No.: 876,910

[52] U.S. Cl. ..........................................................74/594.4
[51] Int. Cl. .............................................................G05g 1/14
[58] Field of Search ................74/560, 594.4, 594.1; D90/14

[56] References Cited

UNITED STATES PATENTS

| | | | |
|---|---|---|---|
| 2,592,238 | 4/1952 | Brammer | 74/594.4 X |
| 3,186,254 | 6/1965 | Golden et al. | 74/594.4 |
| 3,302,483 | 2/1967 | Golden et al. | 74/594.4 |

FOREIGN PATENTS OR APPLICATIONS

| 595,853 | 7/1959 | Italy | 74/594.4 |
|---|---|---|---|

Primary Examiner—William F. O'Dea
Assistant Examiner—F. D. Shoemaker
Attorney—Hill, Sherman, Meroni, Gross & Simpson

[57] ABSTRACT

Bicycle pedal including a hub journaled on a pedal shaft extending from the crank arm of a bicycle sprocket and having crossbars at opposite ends of the hub, and tread supports connecting the crossbars together. The tread supports are uniformly bowed in plan and are generally channel shaped in cross section and have hollow treads rectangular in cross section slid along the supports from the inner ends of the supports. The inner ends of the tread supports are crimped to the inner crossbar. Each pedal tread has an outwardly opening channel extending along its outer side having a reflector visible along the channel. In one form of the invention the reflector is slipped along a channel before the pedal tread is slipped along its tread support and is retained in position by the bow of the pedal tread and tread support as slipped along the channel. In other forms of the invention the reflectors are directly carried by the tread supports and retained in position by the treads. The base of the channel is transparent.

6 Claims, 11 Drawing Figures

PATENTED APR 25 1972 3,657,945

INVENTORS.
Gerald Golden
Charles V. Wrobel

BY 3,657,945

REFLECTOR BICYCLE PEDAL

SUMMARY AND OBJECTS OF THE INVENTION

An object of the present invention is to improve upon the safety of bicycle pedals by so arranging the pedal as to contain a reflector extending along the outer side thereof for substantially the length thereof, so as to be readily visible to the eye.

Another object of the invention is to provide an improved form of bicycle pedal construction having reflectors extending along the outer sides of the pedal treads and protected and retained in position by the treads and mounted in such a manner as to be readily visible.

Still another object of the invention is to provide a new and improved bicycle pedal in which the treads of the pedal are hollow and rectangular in cross section and slip along bowed tread supports and have channels extending along their outer sides forming retaining means for reflectors extending therealong in position to be readily visible to the eye.

A still further object of the invention is to provide an improved means for mounting reflectors on bicycle pedals, in which the reflectors are retained to the pedal treads by bowing the treads as slipped along bowed tread supports therefor.

Another and important object of the invention is to provide an improved form of bicycle pedal in which reflectors are carried by the tread supports for the pedal treads and are retained in position by the pedal treads and are visible to the eye through transparent plastic faces of channels extending along the pedal treads to form integral parts of the treads.

Other objects, features and advantages of the invention will be readily apparent from the foregoing description of certain preferred embodiments thereof, taken in conjunction with the accompanying drawings, although variations and modifications may be effected without departing from the spirit and scope of the novel concepts of the disclosure.

DESCRIPTION OF PREFERRED EMBODIMENTS OF INVENTION

Figure 1:
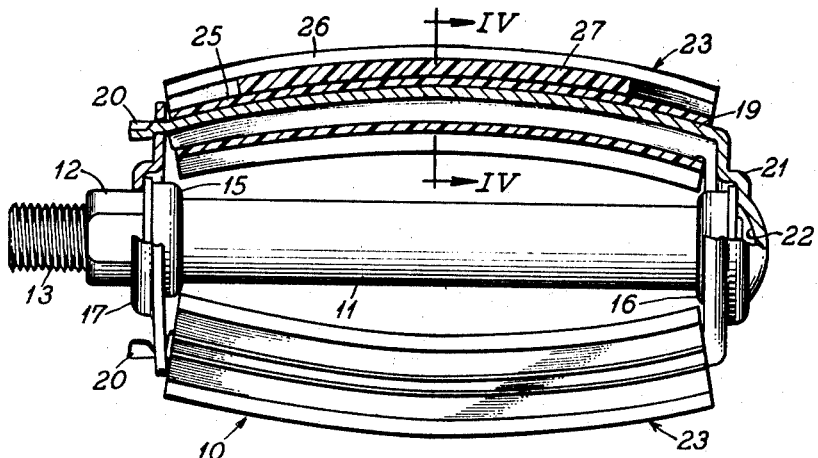
FIG. 1 is a top plan view of a bicycle pedal constructed in accordance with the principles of the present invention, with one of the pedal treads, its support and the reflector carried by the pedal tread shown in horizontal section, and with certain other parts broken away and shown in section.
Figure 2:
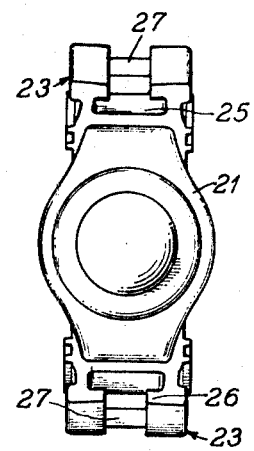
FIG. 2 is an end view of the pedal shown in FIG. 1, looking at the pedal from the outer end thereof.
Figure 3:
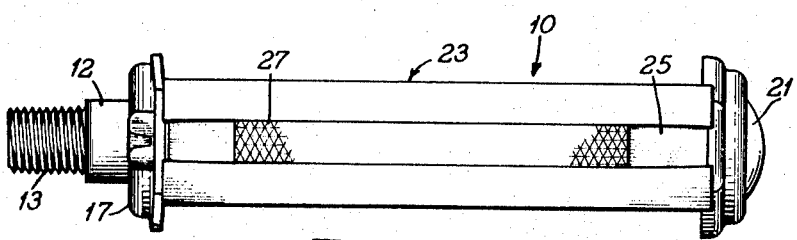
FIG. 3 is a view in side elevation of the pedal shown in FIGS. 1 and 2.

In the embodiment of the invention illustrated in FIGS. 1 through 4 of the drawings, we have shown a bicycle pedal 10 including a hub 11 journaled on a pedal shaft 12 on ball bearings (not shown) in a conventional manner and no part of the present invention so not herein shown or described. The pedal shaft 12 has a threaded inner end portion 13 adapted to be threaded on a crank arm of a bicycle sprocket (not shown), for driving the sprocket.

The hub 11 has enlarged diameter opposite end portions 15 and 16, raised with respect to a sleeve-like intermediate portion of said hub to form internal bearing races (not shown) for the bearings journaling the hub on a pedal shaft 12. A crossbar 17 extends about the shaft 12 and a raised portion 15 of the hub 11 and abuts the inner end of said raised portion. Said crossbar is retained in abutting engagement with the raised portion 15 by pedal tread supports 19 having end tabs 20 extending through slotted portions of said crossbar at opposite ends thereof, and crimped to said pedal supports in a conventional manner.

The pedal tread supports 19 are shown as being formed integrally with an outer crossbar 21 at the opposite end of the hub 11 from the crossbar 17. The outer crossbar 21 has a dished portion 22 engaging a flanged end portion of the raised end portion 16 of the hub 11 and maintained in firm engagement with said flanged end portion by the crimping of the pedal tread supports to the crossbar 17.

Figure 4:
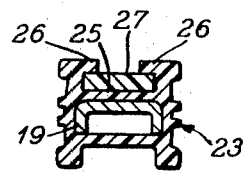
FIG. 4 is a transverse cross sectional view of the tread and its support taken substantially along line IV—IV of FIG. 1.
Figure 5:
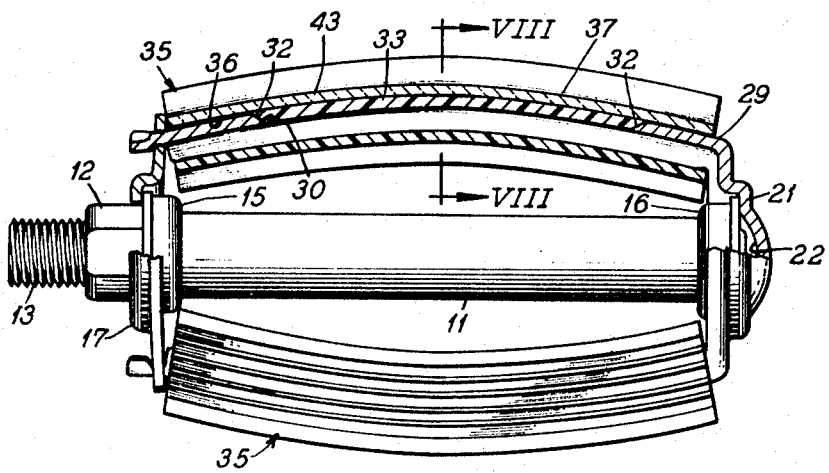
FIG. 5 is a plan view of a modified form of bicycle pedal constructed in accordance with the principles of the present invention, with one of the pedal treads and its support shown in horizontal section and with certain other parts broken away and shown in section.
Figure 6:
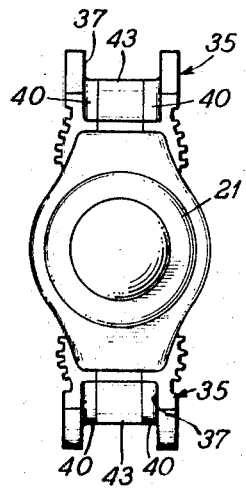
FIG. 6 is an end view of the pedal shown in FIG. 5.

The pedal tread supports 19 are shown in FIG. 1 as being uniformly bowed in plan and in FIG. 4 as being channel-like in cross section, to rigidify the pedal support structure and to provide sufficient bearing area to support pedal treads 23 extending between the crossbars 17 and 21 for substantially the length of said pedal supports.

The pedal treads 23 may be formed from plastic extrusions and are shown in FIGS. 1 and 4 as being hollow and generally rectangular in cross section and as having spaced ribs extending along the top and bottom sides thereof to provide a firm grip for the foot in pedaling the bicycle. As shown in FIG. 4, the hollow interior portions of the pedal treads are rectangular in cross section to closely fit along the pedal tread supports 19 as slipped thereon from the open ends thereof prior to crimping the pedal supports to the crossbar 17.

The outer faces of the pedal treads are channel-like in cross section and have an outwardly facing channel 25 extending therealong having a flat bottom, parallel side walls and gibs 26 extending over said channel in parallel spaced relation with respect to the bottom thereof, and cooperating with said channel to form a retainer for a reflector 27. Said reflector is slipped along said channel, preferably prior to mounting the pedal tread 23 on the pedal support 19.

The pedal tread 23 is preferably made from a resilient plastic material, but may be made from rubber or rubber-like materials.

The reflector 27 may be a reflector of the jeweled type and may also be made from a plastic material commonly used in the making of such reflectors and sufficiently resilient to conform to the pedal tread 23 as slipped along the channel-like tread support 19.

The reflector 27 is of an elongated rectangular form having parallel side walls and is of a thickness equal to the distance between the base of the channel 25 and the undersides of the gibs 26, and is slidably moved into position along the associated pedal tread along the channel 25 prior to bowing of the pedal tread as inserted along the pedal tread support 19.

Bowing of the pedal tread 23 as the tread is inserted along the bowed pedal tread support 19 brings the opposite ends of the channel 25 inwardly beyond opposite ends of the reflector 27 and serves to move the end portions of the gibs 26 inwardly toward each other at opposite ends of the channel. The channel and gibs will thus firmly clamp the reflector 27 in position in the channel 25 of the pedal tread 23 and the convergence of opposite end portions of the channel and gibs is such that the reflector cannot be removed from the pedal treads without removing the pedal tread from its pedal tread support 19.

In the form of the invention illustrated in FIGS. 5 through 9, the pedal is of the same general construction as that shown in FIGS. 1 through 4, so like part numbers will be applied to the parts like those shown in FIGS. 1 through 4. In this form of the invention, pedal tread supports 29, bowed in plan view, are shown as extending from opposite ends of an outer crossbar 21 and as crimped to an inner crossbar 17 in the same manner the tread supports 19 are crimped to the crossbar 17 in the pedal shown in FIG. 1.

The tread supports 29 have rectangular slots 30 extending therealong, having beveled side walls 31 and beveled end walls 32 diverging from the inner to the outer sides of the pedal tread supports for receiving a reflector 33, which may be a jeweled reflector similar to the reflector 27, made from a relatively resilient plastic material and having beveled end and side walls conforming to the bevel of the side and end walls of the slots 30 of the pedal tread supports 29.

A pedal tread 35 having a generally rectangular hollow interior portion 36 (FIG. 8) is slipped along each pedal tread support 29 from the open end thereof, prior to assembling the tread support to the crossbar 17. The pedal tread 35 may be a plastic extrusion and is shown as having an outwardly opening channel 37 extending therealong having a base formed by inwardly extending flanged portions 40 having facing parallel side wall 41, 41 extending along opposite sides of a transparent insert 43, which may also be made from a suitable transparent plastic material and may be a plastic extrusion or a molded plastic material. The transparent insert 43 extends for the length of the channel 37 and may be bonded or otherwise secured to the side walls 41,41 of the flanges 40 of the base of the channel. The transparent insert 43 registers with the reflector 33, as shown in FIG. 8, and with the pedal tread 35 retains the reflector in position and enables the reflector to be clearly seen and serve as a warning when riding in the dark, and light is projected thereon.

Figure 7:
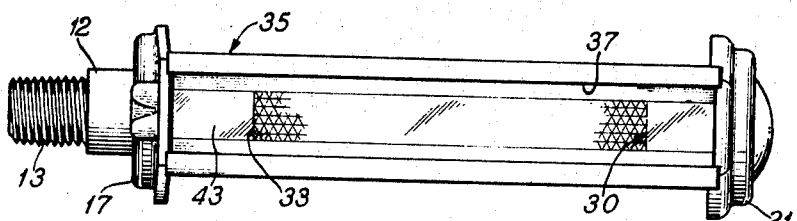
FIG. 7 is a side elevational view of the pedal shown in FIG. 5.
Figure 8:
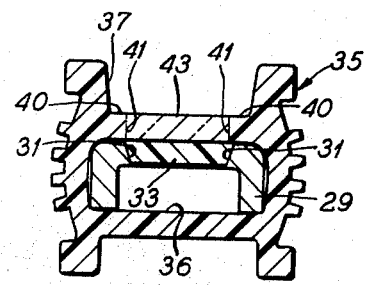
FIG. 8 is an enlarged cross sectional view taken substantially along line VIII—VIII of FIG. 5.
Figure 9:
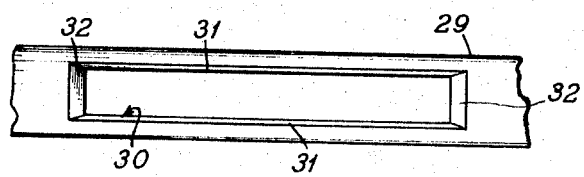
FIG. 9 is a detail view of one of the tread supports, with certain parts broken away.
Figure 10:
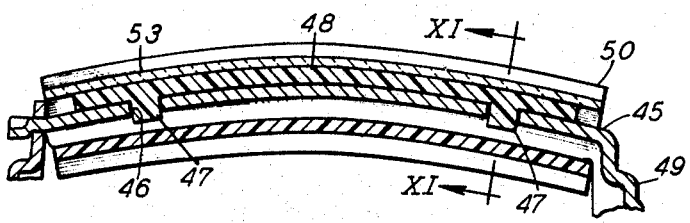
FIG. 10 is a fragmentary view taken along a pedal tread and tread support and showing still another form in which our invention may be embodied.
Figure 11:
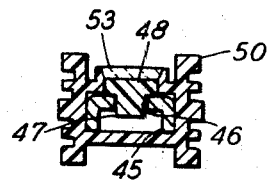
FIG. 11 is an enlarged cross sectional view taken substantially along line XI—XI of FIG. 10.

The modification of the invention illustrated in FIGS. 10 and 11 is similar to the form of the invention illustrated in FIGS. 7,8 and 9, except the elongated slots in the pedal tread supports have been eliminated. In this form of the invention a pedal tread support 45 is shown which is like the pedal tread support 29, except the tread support has spaced apertured portions 46, for lugs 47 extending inwardly of a reflector 48, to retain the reflector to the pedal tread support. It is understood that two similar pedal tread supports extend from a pedal frame 49, as is conventional in bicycle pedals. The reflector 48 may be a molded plastic reflector and the spaced lugs 47 may be molded integrally therewith. A pedal tread 50 which may be a plastic extrusion and has a rectangular internal hollow portion is slipped along the pedal tread support 45 and reflector 48 to retain the reflector in position and to form a pedal tread to be engaged by the foot. The pedal tread 50 has an outwardly facing channel-like portion having a transparent section 53 extending along the reflector for the length of the pedal tread as in the form of the invention illustrated in FIGS. 5 through 9, to enable the reflector to clearly show through the pedal tread and to thereby reflect beams of light when riding in the dark.

In each form of the invention the pedal treads serve to permanently hold the reflectors in position to be readily viewed from the exterior of the pedal and enable the use of reflectors to extend for substantially the lengths of the pedal treads, so as to efficiently reflect beams of light when riding in the darkness, to serve as a warning and to enhance the appearance of the pedal in daylight.

We claim as our invention:

1. In a bicycle pedal,
a pedal shaft adapted for mounting on the crank of the sprocket of a bicycle,
a hub extending along said pedal shaft for a portion of the length thereof,
a first crossbar extending in opposite directions from the inner end of said hub,
a second crossbar extending in opposite directions from the outer end of said hub,
pedal tread supports extending from opposite ends of said second crossbar through said first crossbar and secured thereto, to retain said crossbars into engagement with said hub,
a hollow resilient pedal tread generally rectangular in cross section and having a rectangular interior portion extending along each of said tread supports,
said pedal treads each having outwardly opening channels extending therealong, and also opening to the inside of said pedal treads,
said pedal tread supports being channel-like in cross section and each having an elongated rectangular opening extending therealong for a greater portion of a length thereof,
and in registry with said channels extending along said pedal treads when said pedal treads are in position on said pedal tread supports,
an elongate plastic reflector carried in each opening in each pedal tread support and retained to the associated pedal tread support by the pedal tread mounted thereon, in position to be visible from the outside of the pedal through said channel.

2. The bicycle pedal construction of claim 1,
wherein the channels of the pedal treads each have a base including a transparent plastic strip extending therealong in registry with the reflector, to retain the reflector in position and render the reflector visible from the exterior.

3. The bicycle pedal of claim 2,
wherein the transparent plastic strip is bonded to said base and is of a thickness equal to the thickness of said base, and thereby provides a protective transparent retaining covering for said reflector.

4. The bicycle pedal construction of claim 3,
wherein the elongated rectangular opening extending for a greater portion of the length of the tread support has beveled end and side walls, diverging from the inner to the outer ends of said tread supports, and
wherein the reflector has end and side walls conforming to the beveled end and side walls of said elongated rectangular opening and retained in firm engagement with said side walls by said pedal tread.

5. In a bicycle pedal,
a pedal shaft adapted for mounting on the crank of the sprocket of a bicycle,
a hub extending along said pedal shaft for a portion of the length thereof,
a first crossbar extending in opposite directions from the inner end of said hub,
a second crossbar extending in opposite directions from the outer end of said hub,
pedal tread supports extending from opposite ends of said second crossbar through said first crossbar and secured thereto, to retain said crossbars into engagement with said hub,
said pedal tread supports each being channel-like in cross section and each having at least one apertured portion,
a hollow resilient pedal tread rectangular in cross section slidably mounted on each pedal tread support from the end thereof and having a rectangular interior portion extending along each pedal tread support, and
an outwardly opening channel extending therealong,
an elongated plastic reflector having at least one lug extending therefrom engageable with said at least one apertured portion, and extending along each pedal tread support and pedal tread in registry with said channel,
said pedal tread having a transparent plastic strip extending along said channel in registry with the reflector to retain the reflector in position and render the reflector visible from the exterior.

6. The bicycle pedal of claim 5,
wherein the tread supports each have a plurality of apertured portions extending therethrough, and
wherein the reflectors are molded plastic reflectors and each have a plurality of lugs molded integrally therewith and extending through said apertured portions and are retained to the tread supports by the pedal treads.

* * * * *